United States Patent [19]

Greene

[11] 4,079,905
[45] Mar. 21, 1978

[54] SYSTEM FOR PROVIDING AN INDICATION OF WIND SHEAR

[75] Inventor: Leonard M. Greene, Chappaqua, N.Y.

[73] Assignee: Safe Flight Instrument Corporation, White Plains, N.Y.

[21] Appl. No.: 766,548

[22] Filed: Feb. 7, 1977

[51] Int. Cl.² .................................................. G01C 5/00
[52] U.S. Cl. .................................. 244/191; 73/178 R; 244/188; 340/27 R
[58] Field of Search ........................ 73/178 R, 178 T; 235/150.2, 150.22; 244/182, 191, 181, 188; 340/27 R, 27 NA, 27 SS

[56] References Cited

U.S. PATENT DOCUMENTS

| | | | |
|---|---|---|---|
| 3,427,581 | 2/1969 | Hartman | 73/178 R X |
| 3,594,553 | 7/1971 | McElroy | 235/150.2 |
| 3,618,002 | 11/1971 | Stinson | 340/27 R |
| 3,744,309 | 7/1973 | Astengo | 73/178 R |
| 3,814,912 | 6/1974 | Manke et al. | 235/150.2 |
| 3,840,200 | 10/1974 | Lambregts | 244/182 |
| 3,892,374 | 7/1975 | Lambregts | 244/182 |
| 3,930,610 | 1/1976 | Hache | 235/150.2 |
| 3,948,096 | 4/1976 | Miller | 73/178 R |
| 3,955,071 | 5/1976 | Lambregts | 235/150.2 |
| 4,012,713 | 3/1977 | Greene et al. | 235/150.2 X |

Primary Examiner—Stephen G. Kunin
Attorney, Agent, or Firm—Edward A. Sokolski

[57] ABSTRACT

The output of a transducer providing a signal representing the instantaneous airspeed of an aircraft is differentiated and fed to a summing device. Also fed to the summing device are a signal representing the horizontal acceleration of the aircraft which is subtracted from the instantaneous airspeed signal, and a signal in accordance with the downdraft drift angle of the aircraft which is added to the instantaneous airspeed signal. The output of the summing device represents the magnitude of the wind shear condition (rate of change of wind velocity) as modified by a downdraft drift angle signal. This output signal is fed to appropriate indicator apparatus which may comprise an appropriate display, a peak magnitude storage device, a warning device including a dangerous wind condition and/or a telemetering device providing a reading to a ground station for use in advising other aircraft.

9 Claims, 4 Drawing Figures

SYSTEM FOR PROVIDING AN INDICATION OF WIND SHEAR

This invention relates to aircraft instruments, and more particularly to such an instrument which provides an output indicative of wind shear conditions.

Wind shear may be defined as the condition that exists when the velocity and/or direction of the wind is significantly changing. Wind shear can impose a particularly hazardous situation when an aircraft is descending through the air mass while making an approach to an air airport. Information as to the instantaneous wind shear condition could alert the pilot to incipient changes in the airspeed and descent of the aircraft so as to enable him to take immediate corrective action. Further, this information could be relayed to the control tower for use in warning other aircraft which are about to land.

In patent application Ser. No. 629,031, now U.S. Pat. No. 4,012,713, assigned to Safe Flight Instrument Corporation, the assignee of the present application, a system for providing an output signal indicative of the wind shear condition is described. The system of the present invention is an improvement on the system of the prior application in that it additionally utilizes an input in accordance with the downdraft drift angle of the aircraft from the desired flight path, this input being alegebraically summed with the instantaneous airspeed signal and the horizontal acceleration signal, in opposite polarity relationship with the horizontal acceleration signal. Summation of the signals in this manner makes for a more complete determination of a wind condition that would put the aircraft in jeopardy. Thus, for example, a "negative" downdraft drift angle signal, i.e., a signal representing an updaft drift, is used to offset a negative change in the instantaneous airspeed signal in view of the fact that an updraft drift mitigates the danger associated with a negative airspeed change. On the other hand, where we have both negative airspeed changes and downdraft drift, the condition is most dangerous and the combination of these two signals in the generation of the wind shear signal is called for, as provided for in the present system.

It is therefore the principal object of this invention to improve aircraft safety.

It is another object of the invention to provide means for generating a signal indicative of wind shear for providing an indication and/or warning to an aircraft pilot particularly during landing operations.

It is still a further object of this invention to provide improved means for generating a signal representing wind shear modified by a signal representing the downdraft drift angle of an aircraft for transmission to a ground station for utilization in guiding other aircraft.

Other objects of this invention will become apparent as the description proceeds in connection with the accompanying drawings, of which:

Briefly described, the invention is as follows: The electrical output of an aircraft instantaneous airspeed transducer is differentiated to provide an output representing the rate of change of airspeed. A first accelerometer is mounted on the aircraft to sense acceleration along the fuselage reference line of the aircraft. A second accelerometer is mounted on the aircraft to measure the vertical acceleration of the aircraft. The output of the first accelerometer is fed to a summing device which also receives the output of a vertical gyro multiplied by a constant in accordance with the acceleration of gravity ($g\sin\theta$).

The component of the acceleration signal representing $g\sin\theta$ is subtracted from the accelerometer output in the summing device to provide an output signal therefrom representing the horizontal acceleration (inertial) of the aircraft. This horizontal acceleration signal and a signal representing downdraft drift angle are fed in opposite polarity relationship to each other to a second summing device where these signals are algebraically summed with each other and with the differentiated airspeed signal, the output of this second summing device representing wind shear as modified by the signal representing downdraft drift angle. It is to be noted that by differentiating the airspeed signal incipient changes in airspeed are anticipated.

The signal output of the second summing device is fed to appropriate signal processor means, which may comprise a direct display device, a threshhold detector operating in conjunction with a warning device which provides a warning signal when the modified wind shear signal exceeds a predetermined magnitude, a peak detector and storage device for providing a reading in accordance with the peak magnitude of the signal over a predetermined period of time, and/or a telemetering transmitter for transmitting signals in accordance with the output to a ground station for display or other readout.

Figure 1:
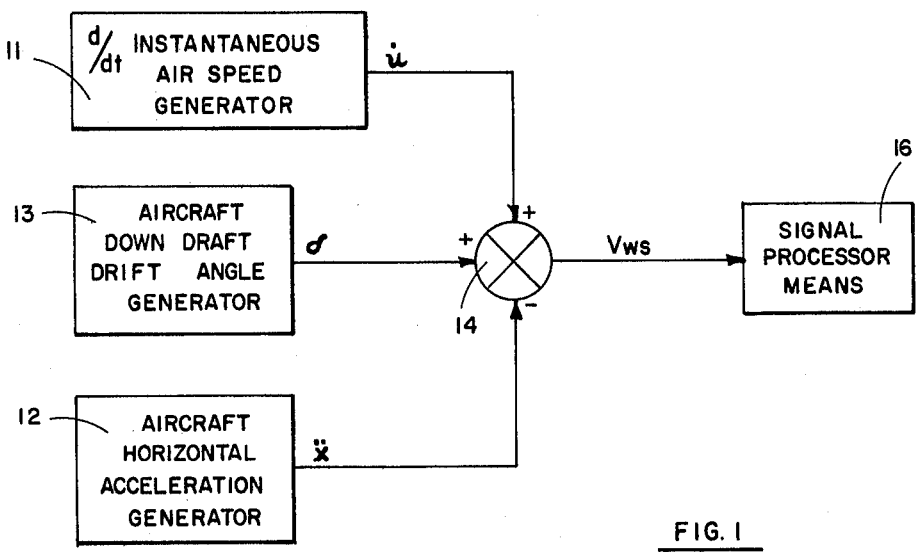
FIG. 1 is a schematic drawing indicating the basic features of the invention.

Referring now to FIG. 1, the basic operation of the system of the invention is schematically illustrated. Differentiated ($d/dt$) instantaneous airspeed generator 11 provides an output, $\dot{u}$, representing the rate of change in the instantaneous airspeed of the aircraft. As to be explained further on in the specification in connection with FIG. 2, such a signal may be conveniently generated by differentiating the electrical output of an instantaneous airspeed transducer (normally available in the aircraft). Aircraft horizontal acceleration generator 12 provides an output, $\ddot{x}$, which is in accordance with the horizontal acceleration of the aircraft. This signal may be obtained by means of an accelerometer mounted along the fuselage line of the aircraft, the output of which is compensated to eliminate vertical components of acceleration due to gravity. Such an output may also be obtained directly from the accelerometer by mounting such accelerometer on an inertially stabilized platform so that it remains stabilized in a horizontal plane regardless of the pitch of the aircraft.

Aircraft downdraft drift angle generator 13 provides an output, $\delta$, which is in accordance with the vertical drift angle of the aircraft from its still air flight path. The horizontal acceleration signal, $\ddot{x}$, is substrated from the instantaneous airspeed signal, $\dot{u}$, while the downdraft angle signal, $\delta$, is added to the instantaneous airspeed signal in summing device 14. As already noted, the addition of the downdraft drift angle signal enables a better determination of wind conditions that would place the aircraft in jeopardy (i.e., if there is negative downdraft drift with a negative airspeed rate this would not be as dangerous as where there were a negative airspeed rate along with a positive downdraft drift). The output of summing device 14 represents wind shear ($V_{ws}$) (as modified by the downdraft drift angle signal), and is in accordance with the rate of change of wind velocity. This wind shear signal can be either positive or negative and is fed to signal processor means 16 which may include a display which continually indicates the measured wind shear, a peak signal device which can be used with a display to indicate the peak magnitude of wind shear over a predetermined time interval, a threshhold detection device which operates in conjunction with a warning device to indicate when wind shear has exceeded a predetermined magnitude, and/or a telemetering system for transmitting signals in accordance with the measured wind shear to a ground station for display.

Figure 2:
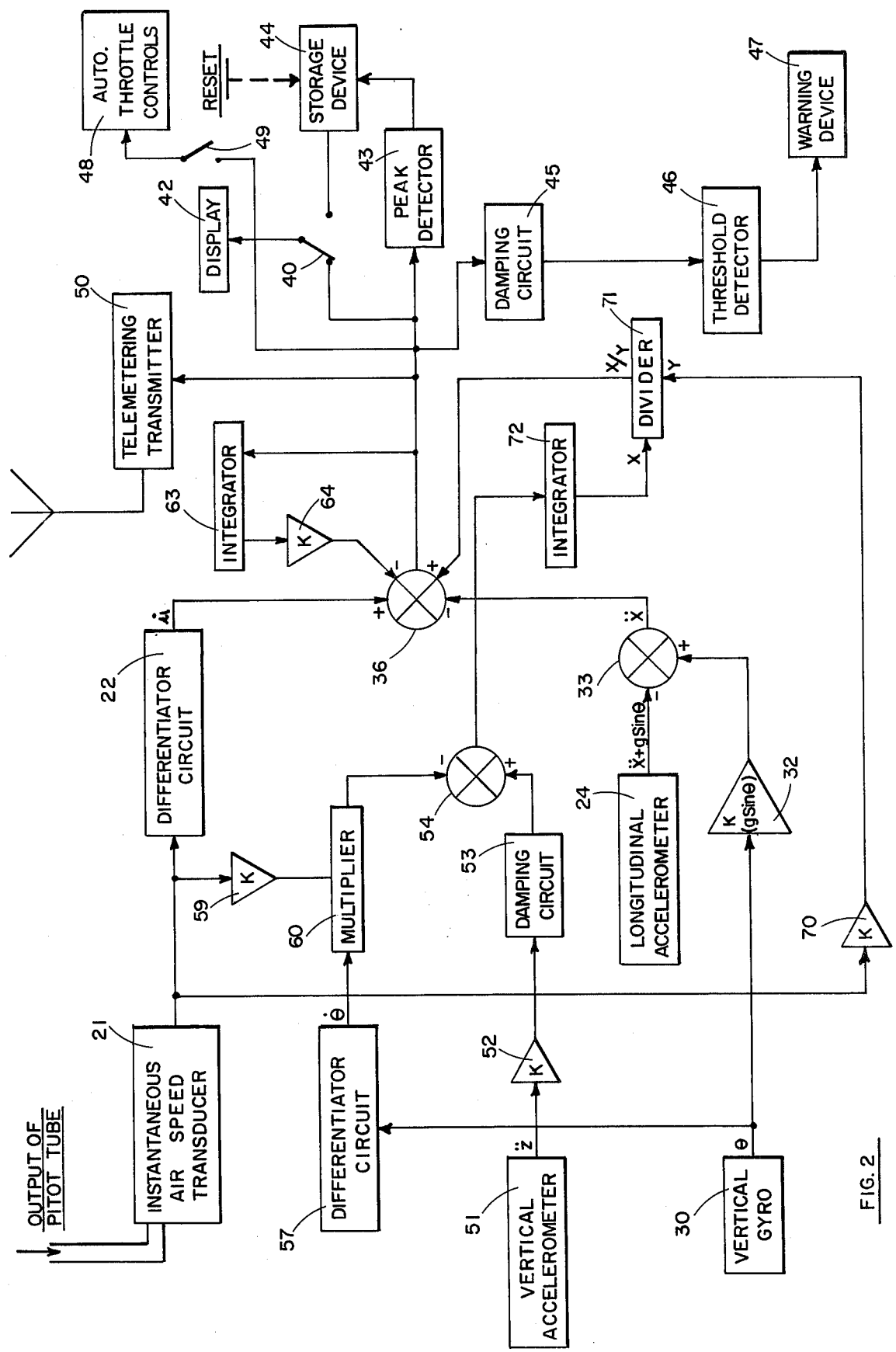
FIG. 2 is a functional block diagram illustrating a preferred embodiment of the invention.

Referring now to FIG. 2, a preferred embodiment of the invention is schematically illustrated. The instantaneous airspeed transducer 21 receives the output of the aircraft pitot tube and generates an electrical output signal, $u$, in accordance with the instantaneous airspeed of the aircraft. This electrical output is differentiated in differentiator circuit 22 to provide an output signal, $\dot{u}$, in accordance with the rate of change of instantaneous airspeed. Longitudinal accelerometer 24 is mounted along the longitudinal axis of the aircraft (fuselage reference line), and provides an output proportional to $\ddot{X} + g\sin\theta$ where $\ddot{X}$ is the horizontal acceleration of the aircraft, $g$ is the acceleration of gravity (32.2 ft/sec), and $\theta$ is the pitch angle of the aircraft. Vertical gyro 30 provides an electrical output signal in accordance with $\theta$, this signal being multiplied by a factor representing gravity and converted to its sine function in amplifier 22. The output of amplifier 32 is subtracted from the output of accelerometer 24 in summing device 33 to provide a signal $\ddot{x}$, which represents the horizontal acceleration of the aircraft independent of pitch. The output of summing device 33 is subtracted from the output of differentiator circuit 22 in summing device 36. The system described thus far in connection with FIG. 2 is that of the aforementioned prior application. The improvement of the present application which involves the additional use of a measurement in accordance with downdraft drift angle will now be described.

Vertical accelerometer 51 generates a signal in accordance with the vertical acceleration of the aircraft, $\ddot{z}$. This vertical acceleration signal is multiplied by a predetermined constant in amplifier 52, and fed to damping circuit 53. Amplifier 52 and damping circuit 53 are designed to establish the desired criteria in determining the significance of vertical acceleration in the output signal of the system. Amplifier 52 determines the amplitude of the signal representing acceleration, while damping circuit 53 varies this amplitude as a function of the signals's time duration. Damping circuit 53 may comprise a low pass filter which filters out noise in the output of the vertical accelerometer. The output of damping circuit 53 is fed to summing device 54. Also fed to summing device 54 is a signal from multiplier 60 in accordance with vertical acceleration of the aircraft not due to vertical air currents which is subtracted from the total vertical acceleration signal fed to the summing device from damping circuit 53.

Figure 3:
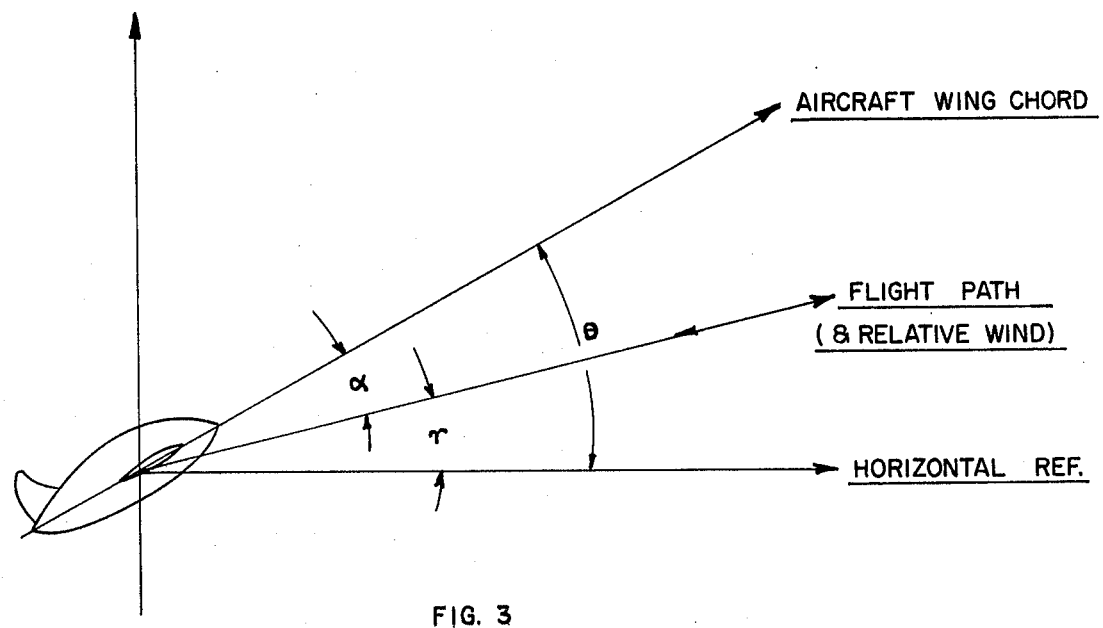
FIG. 3 is a schematic diagram illustrating certain parameters involved in the implementation of the invention.

To facilitate an understanding of the significance of the signal from multiplier 60, which compensates for aircraft maneuvers, attention is direction to FIG. 3. In FIG. 3, the angle marked "$\theta$" represents the pitch of the aircraft, the angle marked "$\alpha$" represents the angle of attack of the aircraft, and the angle marked "$\gamma$" inidicates the climb gradient of the aircraft. It will be apparent that:

$$V_v = \sin \gamma \qquad (1)$$

where $V_v$ is the vertical velocity and V is the aircraft velocity along its flight path. As $\gamma$ is equal to $\theta - \alpha$ we can differentiate and substitute in equation (1) as follows:

$$\frac{dV_v}{dt} = V\cos(\theta - \alpha) \left[ \frac{d\theta}{dt} - \frac{d\alpha}{dt} \right] \qquad (2)$$

Climb gradient, $\gamma$, in normal landing situations would be approximately 3°. Therefore, $\cos(\theta-\alpha) \simeq 1$. Also, since in landing approaches, a nearly constant $\alpha$ is programmed, ($d\alpha/dt$) can be ignored.

Therefore, to give a close approximation of vertical acceleration due to the pitching of the aircraft, equation (2) can be modified to read as follows:

$$\frac{dV_v}{dt} = V\frac{d\theta}{dt} \qquad (3)$$

Equation (3) is implemented as now to be described in connection with FIG. 2. An output from vertical gyro 30 in accordance with the pitch ($\theta$) of the aircraft is fed to differentiator circuit 57. A signal in accordance with the instantaneous airspeed of the aircraft is appropriately scaled in amplifier 59 to give a signal properly representing "V" and fed to multiplier 60. In multiplier 60 the output $\dot{\theta}$ of differentiator circuit 57 is multiplied by V to provide the desired implementation of equation (3). The output of multiplier 60 is fed to summing device 54 where, as already noted, it is subtracted from the signal in accordance with the total vertical acceleration of the aircraft to provide a signal representing vertical acceleration due to vertical air currents. The output of summing device 54 is fed to integrator 72 where it is integrated or averaged, the output of the integrator being fed to divider 71. It is to be noted that this averaged signal is a direct function of the magnitude of the vertical air currents causing the vertical acceleration.

Also fed to divider 71 is a signal, "y", representing aircraft airspeed as modified by a constant factor, this signal being taken from instantaneous airspeed transducer 21 and modified by a predetermined scaling factor by means of amplifier 70.

Figure 4:
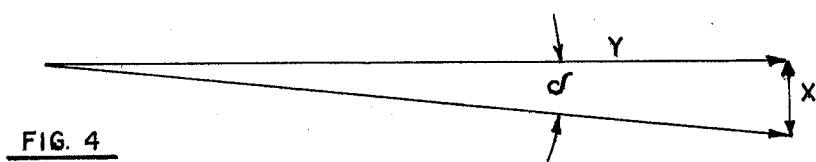
FIG. 4 is a schematic diagram illustrating the development of the downdraft drift angle signal in the device of the invention.

Integrator 72 has a washout associated with it. The washing circuit is such that it allows the system to be responsive only to changes from a previously averaged condition. The output "x" of integrator 72 represents the vertical velocity experienced within the time frame of the washout circuit. This quantity is the actual change in vertical speed due to the localized vertical air currents in a sudden downdraft (downburst). The downdraft drift angle is then obtained by dividing the output of 72 by the aircraft's airspeed. This, in effect, is the aircraft's downdraft drift angle ($\delta$) insofar as extreme and dangerous disturbances are concerned. The computation of $\delta$ can be more readily seen by reference to FIG. 4 where the vector "y" represents the aircraft's airspeed and the vector "x" represents the magnitude of vertical air currents. It thus can be seen that the aircraft downdraft drift angle, $\delta$, is defined as follows:

$$\tan \delta = \frac{x}{y} \qquad (1)$$

The output of divider 71 is fed to summing device 36 where it is added to the output of differentiator circuit 22. The output of this differentiator circuit provides an anticipation of airspeed changes and thus anticipates incipient wind shear conditions.

The system of the present invention can be viewed as a "thrust available" system. Horizontal wind shear in gravity units of acceleration (g's) and the downdraft drift angle of the flight path, in radians, are directly additive. The sum total represents the loss of available thrust. Consider a horizontal wind shear due to a tail wind increase of 1 knot per second (equivalent to 1/20 g) and a downdraft drift angle of almost 3° of flight path (equivalent to 1/20 of a radian). If these occur simultaneously, the effect is additive and would result in the requirement of 1/10 g of additional thrust (or an additional thrust requirement of 10% of the weight of the aircraft). This additional requirement would be necessary to offset the vertical wind and the horizontal wind shear, so as to maintain the airplane's speed and the flight path to what it would be without these wind factors.

It is to be noted that means other than a vertical accelerometer can be used to develop the vertical air current signal. Other such signal sources well known in the art include:
(1) Vertical speed indicators (both instantaneous and pitot static devices);
(2) Computed vertical speed from air data computes;
(3) The rate of change signal from electrical altimeters.

Integrator 63 and amplifier 64 provide negative feedback to summing device 36 which operates to wash out offset errors that may appear in the system. The time constant of interator 63 is made appropriately large enough to wash out offset errors but so as not to affect the basic response of the system of the levels of warning.

As for the system described in the aforementioned application, the wind shear output of summing device 36 may be utilized in several ways. First, the signal may be fed directly through selector switch 40 to display 42. Display 42 may comprise a galvanometer calibrated to directly read equivalent wind shear in knots/second or it may comprise a digital readout device providing such a reading. The output signal may also be fed to peak detector 43 and from this detector to storage device 44, which may comprise a capacitive storage circuit which stores the peak signal received thereby from detector 43. Switch 40 may be used to alternatively provide a reading on display device 42 of the peak signals stored in storage device 44 or the instantaneous magnitude of the wind shear appearing at the output of summing device 36. Storage device 44 may be reset to zero after a predetermined monitoring period has been completed.

Threshhold detector 46 which operates in conjunction with warning device 47 is used to provide a warning to the pilot that a dangerous wind shear condition exists. Threshhold detector 46 may comprise a trigger circuit biased so that it is actuated when the signal fed thereto from summing device 36 through damping circuit 45 exceeds a predetermined value, this value representing a predetermined wind shear condition considering both the horizontal acceleration and vertical downdraft due to wind shear and vertical wind currents respectively. When threshhold detector 46 is actuated, it in turn actuates warning device 47 which may comprise a horn, buzzer, warning light or the like. A telemetering transmitter 50 may also be provided to transmit wind shear information to a ground station for use by a ground controller in guiding the landings of other aircraft. In this manner, accurate information can be provided to warn incoming pilots of dangerous wind shear conditions.

An output signal may also be fed from summing device 36 to automatic throttle controls 48 through switch 49, and this signal used to automatically modify aircraft thrust in response to wind shear conditions.

While the invention has been described and illustrated in detail, it is to be clearly understood that this is intended by way of illustration and example only and is not to be taken by way of limitation, the spirit and scope of this invention being limited only by the terms of the following claims.

I claim:
1. A system for generating a wind shear signal representing the wind shear condition encountered by an aircraft modified by the downdraft drift angle of the aircraft, comprising:
   means for generating a signal representing the rate of change of the instantaneous airspeed of the aircraft,
   means for generating a signal representing the horizontal inertial acceleration of the aircraft,
   means for generating a signal representing the downdraft drift angle of the aircraft,
   means for subtracting the horizontal inertial acceleration signal from the rate of change of instantaneous airspeed signal and adding the downdraft drift angle signal to the rate of change of instantaneous airspeed signal to provide an output signal representing wind shear modified by aircraft downdraft drift angle, and
   means for processing said output signal to provide an indication representing the magnitude thereof.
2. The device of claim 1 wherein said processing means comprises a display for directly displaying the magnitude of the output signal.
3. The system of claim 1 wherein said processing means comprises a warning device for generating a warning signal and detector means responsive to the output signal for actuating said warning device when the output signal exceeds a predetermined value.
4. The device of claim 1 wherein said processing means comprises peak detector for providing a peak output signal in accordance with the peak value of said output signal, storage means for storing the peak output signal of said detector means and display means for providing a display in accordance with the peak signal stored in said storage means.
5. The system of claim 1 wherein said processing means comprises a telemetering transmitter for transmitting said output signal to a ground station.
6. The system of claim 1 wherein said means for generating a signal in accordance with the rate of change of airspeed comprises an instantaneous airspeed transducer for providing an output signal in accordance with instantaneous airspeed and differentiator means for differentiating the output signal from said transducer.
7. The system of claim 1 wherein said means for generating a signal in accordance with aircraft horizontal acceleration comprises an accelerometer mounted along a fuselage reference line of said aircraft and hav- ing an output representing accelerations along said reference line, means for generating a signal in accordance with the pitch of said aircraft and means for subtracting said signal in accordance with aircraft pitch from the output of said accelerometer representing accelerations along said reference line.

8. The system of claim 6 wherein said means for generating a signal in accordance with the downdraft drift angle of the aircraft comprises a vertcial accelerometer, means for damping signal in accordance with the downdraft drift angle, means for generating a signal in accordance with aircraft vertical acceleration not due to vertical air currents, means for subtracting said last mentioned signal from the damped signal in accordance with the downdraft drift angle to provide a difference signal, and means for dividing said diffference signal by the output signal from said instantaneous airspeed transducer.

9. The system of claim 1 and further including automatic throttle controls for the aircraft and means for selectively coupling the output signal to said automatic throttle controls to thereby cause the thrust of the aircraft to be automatically modified in response to said output signal.

* * * * *